United States Patent
Kryger

(10) Patent No.: US 7,529,777 B1
(45) Date of Patent: May 5, 2009

(54) CROSS-OBJECT ATTRIBUTE RESTORATION

(75) Inventor: Nathan Kryger, Snoqualmie, WA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/365,261

(22) Filed: Feb. 28, 2006

(51) Int. Cl.
*G06F 17/30* (2006.01)

(52) U.S. Cl. ............... 707/202; 707/101; 707/203; 707/204; 707/103 R

(58) Field of Classification Search ......... 707/200–205, 707/103 R; 711/162
See application file for complete search history.

(56) References Cited

U.S. PATENT DOCUMENTS

| | | | | |
|---|---|---|---|---|
| 6,016,393 | A * | 1/2000 | White et al. | 719/315 |
| 6,018,744 | A * | 1/2000 | Mamiya et al. | 707/104.1 |
| 6,496,944 | B1 * | 12/2002 | Hsiao et al. | 714/15 |
| 6,857,053 | B2 * | 2/2005 | Bolik et al. | 711/162 |
| 6,865,045 | B2 * | 3/2005 | Kuriyama et al. | 360/60 |
| 6,950,915 | B2 * | 9/2005 | Ohno et al. | 711/162 |
| 2002/0178249 | A1 * | 11/2002 | Prabakaran et al. | 709/223 |
| 2003/0074378 | A1 * | 4/2003 | Midgley et al. | 707/204 |
| 2003/0097383 | A1 * | 5/2003 | Smirnov et al. | 707/204 |
| 2004/0230674 | A1 * | 11/2004 | Pourheidari et al. | 709/223 |
| 2005/0071393 | A1 * | 3/2005 | Ohno et al. | 707/204 |
| 2005/0172093 | A1 * | 8/2005 | Jain | 711/162 |
| 2006/0004890 | A1 * | 1/2006 | Semple et al. | 707/204 |

OTHER PUBLICATIONS

Quest Recovery Manager for Active Directory, © 2005 Quest Software, Inc. pp. 1-3.*
Document Object Model Core, Arnaud Le Hors (or hereinafter "Arnaud"), Nov. 13, 2000, pp. 1-53.*
Document Object Model Core, Arnaud Le Hors (or hereinafter "Arnaud Le"), Jul. 4, 2004, pp. 1-108.*

* cited by examiner

*Primary Examiner*—Cam Y T Truong
(74) *Attorney, Agent, or Firm*—Van Pelt, Yi & James LLP

(57) ABSTRACT

Restoring a directory service object attribute is disclosed. An identification of the directory service object attribute is received for a set of two or more directory service objects across which the directory service object attribute is to be restored. The directory service object attribute is selectively restored across the set of directory service objects.

20 Claims, 4 Drawing Sheets

CROSS-OBJECT ATTRIBUTE RESTORATION

BACKGROUND OF THE INVENTION

A directory service typically manages data about a network and its resources (e.g., users, files, printers, servers, and applications). It may authenticate resources and/or manage identities and relationships between the resources. A directory service typically uses associated directory service objects to perform its functions. For example, the directory service data may include for each of one or more users a network user account data object that includes a user name, an email address, a physical location address, a phone number, authentication information, and other information associated with the user. In some cases, a directory services system administrator may write a script or other program to modify one or more attributes across directory service objects. For example, when a company moves to a new location, a "postalAddress" or equivalent attribute of every directory service object associated with users needs to be updated. Occasionally the system administrator may mistakenly overwrite an attribute with incorrect data, or overwrite the wrong attribute, due to an error in the script. To recover the overwritten attribute without performing an entire directory service system restoration, directory service utilities can be used to restore an attribute for one directory service object at one time. Although the process can be batched, the attribute has to be tediously selected on an individual basis for each object that needs to be recovered. Therefore there exists a need for a more efficient way to restore an attribute for a group of directory service objects.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium. A computer readable storage medium includes a memory. Wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Restoring a directory service object attribute across multiple directory service objects is disclosed. In some embodiments, an identification of a directory service object attribute is used to selectively restore the directory service object attribute across a set of two or more directory service objects. In some embodiments, the selective restore is performed without performing an entire directory service restoration. In various embodiments, the restoration is automated.

Figure 1:
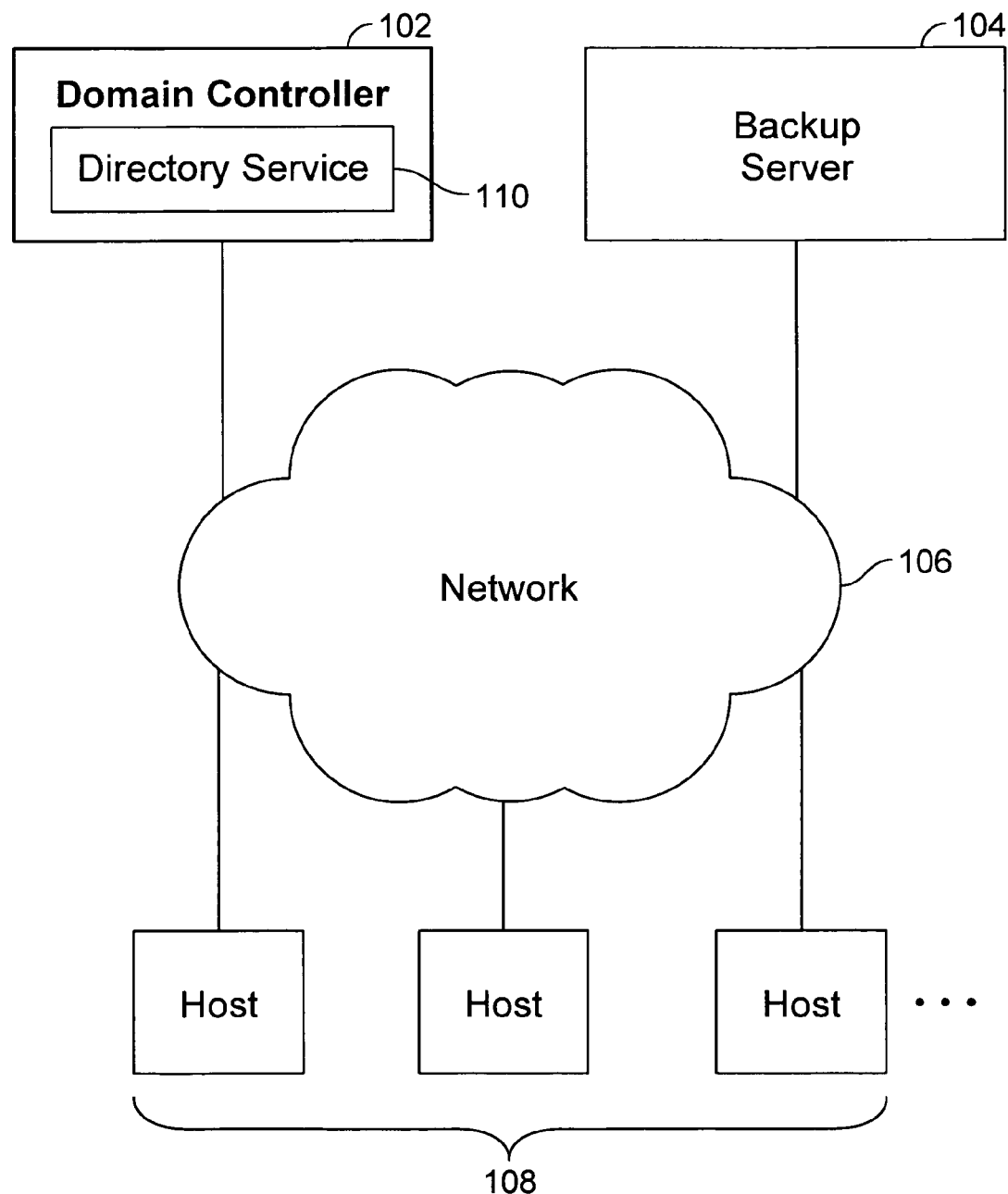
FIG. 1 is a block diagram illustrating an embodiment of a network environment.

FIG. 1 is a block diagram illustrating an embodiment of a network environment. Domain controller 102, backup server 104, and hosts 108 are connected together through network 106. Any number of domain controllers, backup servers, and/or hosts may exist. Network 106 comprises a public or private network and/or combination thereof, for example an Ethernet, serial/parallel bus, intranet, Internet, NAS, SAN, LAN, WAN, and other forms of connecting multiple systems and or groups of systems together. Domain controller 102 includes directory service 110 used to manage data associated with the network domain and its resources. Directory service 110 uses associated directory service data, stored in this example on domain controller 102. In some embodiments the directory service data comprises a set of zero, one, or more data objects and/or other elements of data. Directory service 110 may include one or more of the following: a Microsoft Active Directory, a Lightweight Directory Access Protocol (LDAP) directory service, a Network Information Service (NIS), a Novell eDirectory service, and a Fedora Directory Server. Other network processing and/or functionality may be provided by the domain controller. Directory service 110 included in domain controller 102 is merely an illustrative example. In some embodiments, the directory service may be provided by one or more other network resources and/or units. In various embodiments, hosts 108 include a network resource, a networked computer, and/or any network system. In some embodiments, only one host may exist. At least one host of hosts 108 may desire to access a protected network resource. The host communicates with domain controller 102 that uses directory service 110 to authenticate the host for use of the protected network resource. Backup server 104 coordinates backup and/or recovery of data associated with directory service 110. In some embodiments, backup server 104 coordinates backup and/or recovery of data associated with hosts 108.

Figure 2:
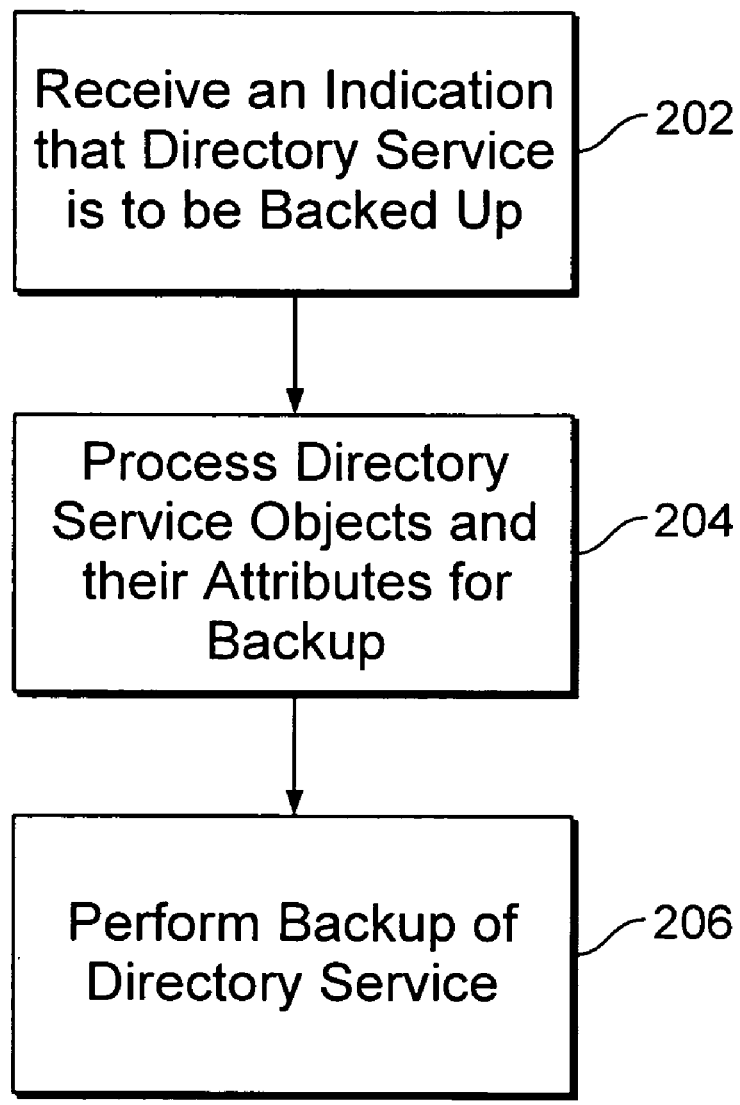
FIG. 2 is a flow chart illustrating an embodiment of a process for backing up a directory service.

FIG. 2 is a flow chart illustrating an embodiment of a process for backing up a directory service. In some embodiments, at least a portion of the process of FIG. 2 is implemented in domain controller 102 and/or backup server 104 of FIG. 1. At 202, an indication that the directory service is to be backed up is received. In some embodiments, the indication includes a specification of one or more directory service objects and/or a specification of one or more directory service object attributes to be backed up. In various embodiments, the specification(s) is specified in a configuration file, backup configuration preferences, and/or system configuration data. At 204, directory service objects and their attributes are processed for backup. In some embodiments, the processing includes formatting and/or organizing the objects and their attributes for backup. The backup format/organization enables attributes of an object in the backup of the directory service to be individually accessed without having to restore entire objects. In some embodiments, the backup format/organization is optimized for efficient traversal of object attributes. For example, the order and/or structure of attribute associated data within the backup is/are optimized for locating desired attributes of objects. In some embodiments, the processing includes determining changes to the directory service since a previous backup of the directory service. At 206, backup of the directory service is performed. In some cases, only changes to the directory service from a previous backup of the directory service is backed up. Performing the backup includes storing data in a storage media. The stored data may be encrypted, compressed, and/or split over a plurality of storage locations.

Figure 3:
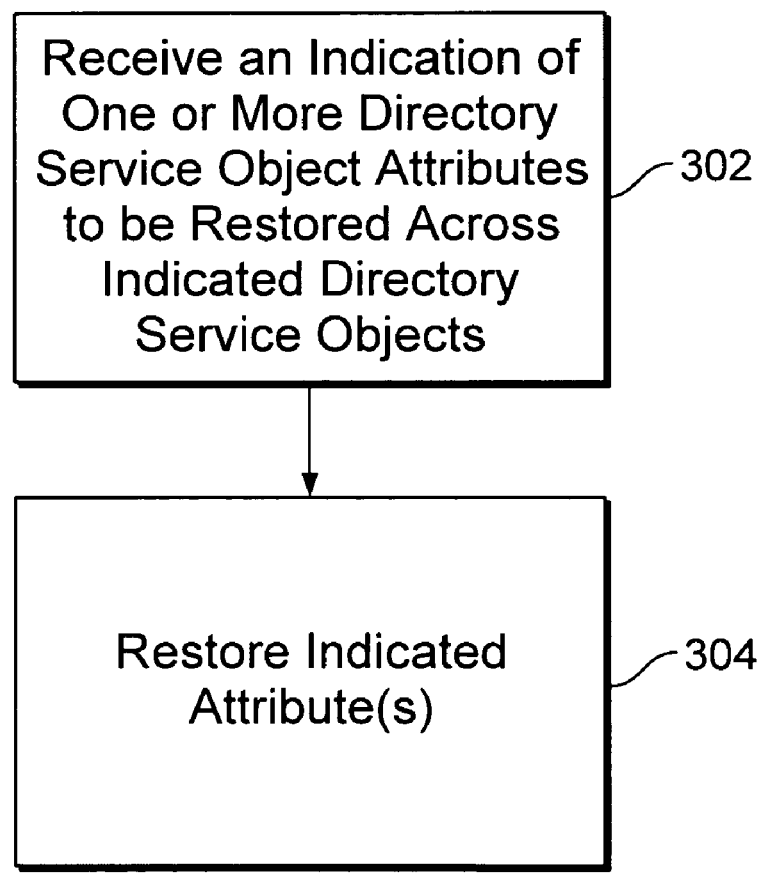
FIG. 3 is a flow chart illustrating an embodiment of a process for restoring one or more indicated directory service object attributes.

FIG. 3 is a flow chart illustrating an embodiment of a process for restoring one or more indicated directory service object attributes. In various embodiments, at least a portion of the process of FIG. 2 is implemented in domain controller 102 and/or backup server 104 of FIG. 1. At 302, an indication of one or more directory service object attributes to be restored across indicated directory service objects is received. In some embodiments, the indication includes an identifier of a directory service object attribute and an identification of a set of two or more directory service objects across which the directory service object attribute is to be restored. For example, an attribute to be restored across a group of directory service objects is specified for a group of directory service object identifiers by a single specification of a directory service object attribute identifier. In some embodiments, a directory service object attribute identifier is specified more than once for a group of directory service objects, and the number of specifications is less than the total number of objects in the group of directory service objects. In some embodiments, indication of directory service objects is optional, and when directory service object indication is not received in 302, the indicated directory service object attribute is restored across all directory service objects associated with a directory service backup, and/or the indicated directory service object attribute is restored across a preconfigured list of directory service objects. In various embodiments, the indication is associated with one or more of the following: a text file including a directory service object attribute identifier, a restoration process configuration, a restoration application configuration, a system configuration, and an indication in response to a user interface prompt. In some embodiments, the indication includes one or more of the following: a backup data to be used to restore the indicated attribute, a backup version to be used to restore the indicated attribute, a time associated with a restore point to which to restore the indicated attribute, and a time associated with a backup instance of the indicated attribute. At 304, the one or more indicated attributes are restored. In some embodiments, restoring the attributes includes traversing a directory service backup data to locate and restore the indicated attributes. In various embodiments, data to be used to restore the attributes is received in 304.

Figure 4:
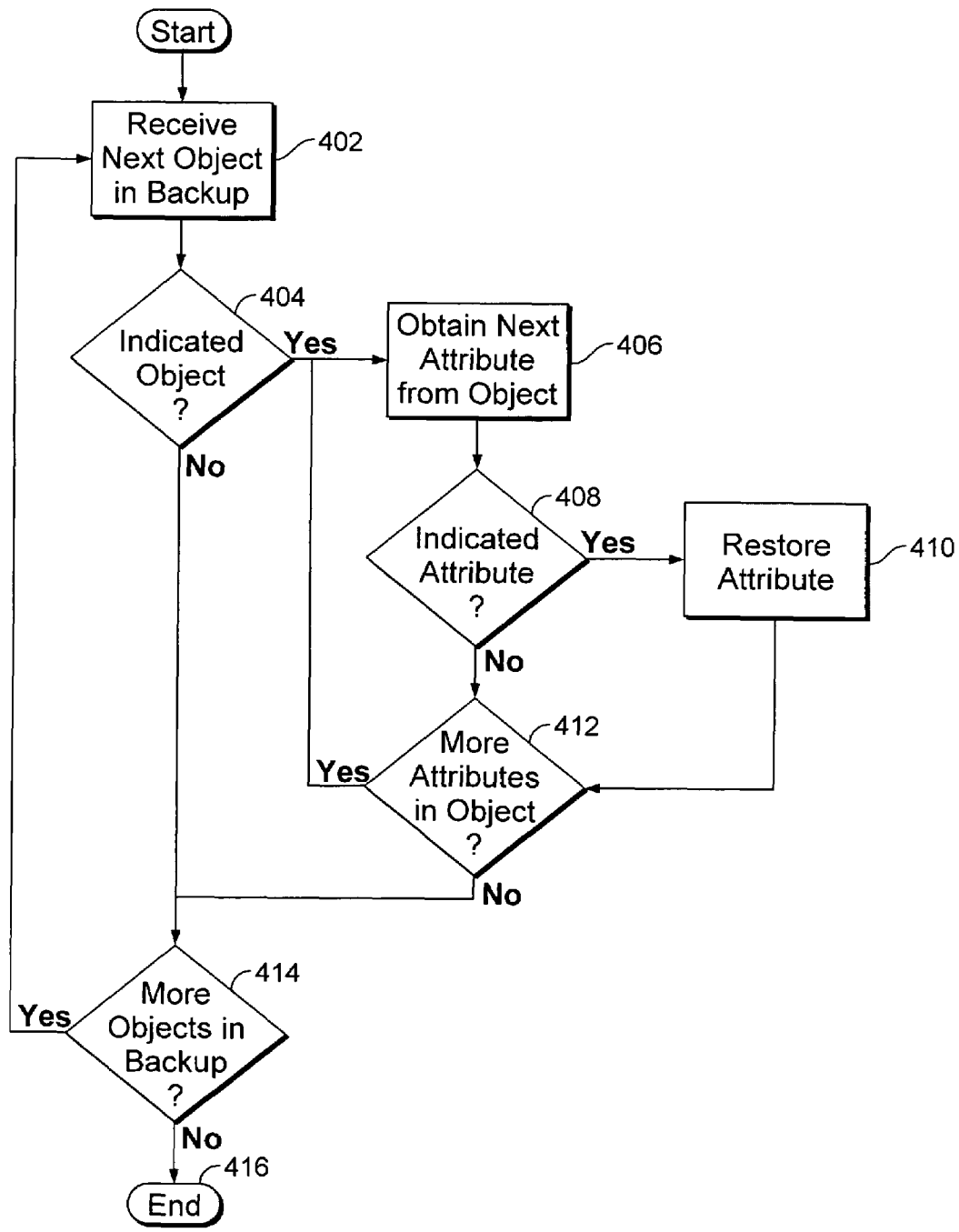
FIG. 4 is a flow chart illustrating an embodiment of a process for traversing a backup data to restore one or more attributes.

FIG. 4 is a flow chart illustrating an embodiment of a process for traversing a backup data to restore one or more attributes. In some embodiments, the process of FIG. 4 is included in 304 of FIG. 3. At 402, a next object in the backup data—the next object being a first object in the case of the first iteration of 402-414 of FIG. 4—is received. The object includes data associated with backup of a directory service object. In some embodiments, an object identifier is received in 402. The backup data includes data associated with one or more directory service objects and its/their respective attribute(s). The backup data may contain other data (e.g., user file backup data) not associated with directory service and/or may include two or more directory service backups. For example the backup data may contain backups created at different times and/or the backups may include different directory service objects. The order in which the objects are received may be preconfigured, the stored order of objects in the backup, and/or randomly chosen from objects that have not been received. At 404, if the received object has been determined to be not an indicated object, i.e., not a directory service object with respect to which the one or more attributes to be restored is/are to be restored, at 414 it is determined whether more objects that have not already been processed are contained in the backup data. In some embodiments, the object is an indicated object if the object is associated with the attribute to be restored and/or is among or associated with a directory service objects indicated in 302 of FIG. 3. At 414, if it is determined that no more objects are contained in the backup data, at 416, the process ends. If at 414 it is determined more objects are contained in the backup data, at 402, the next object to be processed is received.

If at 404 the received object has been determined to be an indicated object, at 406, a next attribute of the received object is obtained. In some embodiments, a directory service object attribute identifier is read from data associated with the received object. At 408, if the obtained attribute has not been determined to be an indicated attribute, at 412, it is determined whether more attributes of the received object that have not been obtained exist. The obtained attribute is an indicated attribute if the attribute is associated with the attribute to be restored and/or is associated with the indication received at 302 of FIG. 3. If at 408 the obtained attribute has been determined to be an indicated attribute, backup data associated with the obtained attribute is used to restore the attribute to be restored, and at 412, it is determined whether more attributes that have not been obtained are associated with the received object. At 412, if one or more attributes has been determined to exist, at 406, a next attribute of the object is obtained. If at 412 one or more attributes has been determined to not exist, at 414, it is determined whether more objects that have not been received are contained in the backup data. The order in which attributes of the received object are obtained in various embodiments is preconfigured, the order in which they are stored in the backup data, and/or randomly chosen from attributes of the object that have not been chosen. In some embodiments, the indicated/desired object is received without traversing every object contained in the backup data. In some embodiments, the indicated/desired object attribute is obtained without traversing every attribute of a received object. In some embodiments, object attributes are traversed first, across objects in a backup, to locate occurrences of an indicated attribute, and the objects associated with the located object attribute are traversed second to restore the indicated attribute(s) for those objects, thereby eliminating the need for an administrator to know or indicate a priori which objects contain the attribute(s) to be restored.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of restoring a directory service object attribute, the method comprising:
   receiving at a computer an identification of the directory service object attribute, wherein the directory service object attribute is restored for a set of two or more directory service objects, wherein each directory service object in the set corresponds to an entity and a given directory service object in the set includes information associated with the corresponding entity;
   in an event, the identification identifies the set of the two or more directory service objects for which the directory service object attribute is restored, selectively restoring the directory service object attribute for the set of the two or more directory service objects without restoring entire contents of at least one directory service object of the set of the two or more directory service objects, wherein the one or more directory service objects are stored in a memory, wherein a number of specifications of the identification of the directory service object attribute is less than a total number of objects in the set of the two or more directory service objects, and wherein a directory service backup data is used in the restoration of the directory service object attribute for the set of the two or more directory service objects, and the directory service backup data is organized in a format that allows an attribute of a backed up directory service object in the directory service backup data to be located without traversing the directory service backup data; and
   in an event, the identification does not identify any directory service object for which the directory service object attribute is restored, restoring the directory service object attribute for the one or more directory service objects that are associated with the directory service object attribute, including:
      traversing a complete set of directory service objects to determine which directory service objects are associated with the directory service object attribute, and restoring the directory service object attribute for directory service objects that are determined to be associated with the directory service object attribute.

2. The method as recited in claim 1, further comprising receiving an identification of the set of two or more directory service objects.

3. The method as recited in claim 1, wherein the selective restoration is performed without performing an entire directory service restoration.

4. The method as recited in claim 1, wherein the directory service object attribute is specified for the set of two or more directory service objects by a single specification of the identification.

5. The method as recited in claim 1, wherein the directory service object attribute is specified for the set of two or more directory service objects by two or more specifications of the identification of the directory service object attribute.

6. The method as recited in claim 1, wherein the identification is associated with one or more of following: a text file including a directory service object attribute identifier, a restoration process configuration, a restoration application configuration, a system configuration, and an indication in response to a user interface prompt.

7. The method as recited in claim 1, wherein the identification includes one or more of following: a backup data to be used to restore the directory service object attribute, a backup version to be used to restore the directory service object attribute, a time associated with a restore point to restore the directory service object attribute, and a time associated with a backup instance of the directory service object attribute.

8. The method as recited in claim 1, further comprising traversing the directory service backup data to locate a value associated with the directory service object attribute.

9. The method as recited in claim 8, wherein the directory service backup data is in a format that enables the value to be accessed without having to restore an entire backed up directory service object associated with the value.

10. The method as recited in claim 8, wherein the directory service backup data includes two or more directory service backups created at different instances.

11. The method as recited in claim 8, wherein the directory service backup data includes a backup of user files not associated with directory service.

12. The method as recited in claim 8, wherein the directory service backup data is traversed in an order associated with one or more of following: a preconfigured order, stored order of items in the directory service backup data, and a random order.

13. The method as recited in claim 1, wherein the set of the one or more directory service objects are associated with authenticating or managing identities and relationships between network resources.

14. The method as recited in claim 1, wherein the set of directory service objects are associated with one or more of following: a Active Directory, a Lightweight Directory Access Protocol directory service, a Network Information Service, a Novell eDirectory service, and a Fedora Directory Server.

15. The method as recited in claim 1, wherein the directory service object attribute is associated with one or more of the following: a user name, an email address, a physical location address, a phone number, and authentication information.

16. The method as recited in claim 1, wherein the selective restoration of the directory service object attribute is performed by a domain controller.

17. The method as recited in claim 1, wherein each directory service object in a set corresponds to an entity and a given directory service object in the set includes contact information or authentication information associated with the corresponding entity.

18. The method as recited in claim 17, wherein the entity includes a user or a host.

19. A system for restoring a directory service object attribute, the system comprising:
   a memory;
   an interface, wherein the interface receives at a computer an identification of the directory service object attribute, wherein the directory service object attribute is restored for a set of two or more directory service objects, wherein each directory service object in the set corresponds to an entity and a given directory service object in the set includes information associated with the corresponding entity, a processor coupled to the interface to:
   in an event, the identification identifies the set of the two or more directory service objects for which the directory service object attribute is restored, selectively restoring the directory service object attribute for the set of the two or more directory service objects without restoring entire contents of at least one directory service object of the set of the two or more directory service objects, wherein the one or more directory service objects are stored in the memory, wherein a number of specifications of the identification of the directory service object attribute is less than a total number of objects in the set of the two or more directory service objects, and wherein a directory service backup data is used in the restoration of the directory service object attribute for the set of the two or more directory service objects, and the directory service backup data is organized in a format that allows an attribute of a backed up directory service object in the directory service backup data to be located without traversing the directory service backup data; and in an event, the identification does not identify any directory service object for which the directory service object attribute is restored, restoring the directory service object attribute for the one or more directory service objects that are associated with the directory service object attribute, including:

traversing a complete set of directory service objects to determine which directory service objects are associated with the directory service object attribute, and restoring the directory service object attribute for directory service objects that are determined to be associated with the directory service object attribute.

20. A computer program product to restore a directory service object attribute, the computer program product being embodied in a computer readable storage medium and the computer program product comprising computer instructions for:

receiving at a computer an identification of the directory service object attribute, wherein the directory service object attribute is restored for a set of two or more directory service objects, wherein each directory service object in the set corresponds to an entity and a given directory service object in the set includes information associated with the corresponding entity;

in an event, the identification identifies the set of the two or more directory service objects for which the directory service object attribute is restored, selectively restoring the directory service object attribute for the set of the two or more directory service objects without restoring entire contents of at least one directory service object of the set of the two or more directory service objects, wherein the one or more directory service objects are stored in a memory, wherein a number of specifications of the identification of the directory service object attribute is less than a total number of objects in the set of the two or more directory service objects, and wherein a directory service backup data is used in the restoration of the directory service object attribute for the set of the two or more directory service objects, and the directory service backup data is organized in a format that allows an attribute of a backed up directory service object in the directory service backup data to be located without traversing the directory service backup data; and in an event, the identification does not identify any directory service object for which the directory service object attribute is restored, restoring the directory service object attribute for the one or more directory service objects that are associated with the directory service object attribute, including:

traversing a complete set of directory service objects to determine which directory service objects are associated with the directory service object attribute, and restoring the directory service object attribute for directory service objects that are determined to be associated with the directory service object attribute.

\* \* \* \* \*